US012795319B2

(12) United States Patent
Tsuruga et al.

(10) Patent No.: US 12,795,319 B2
(45) Date of Patent: Nov. 10, 2026

(54) AUDIO AUGMENTED REALITY OBJECT PLAYBACK DEVICE AND AUDIO AUGMENTED REALITY OBJECT PLAYBACK METHOD

(71) Applicant: MAXELL, LTD., Kyoto (JP)

(72) Inventors: Sadao Tsuruga, Kyoto (JP); Yasunobu Hashimoto, Kyoto (JP); Kazuhiko Yoshizawa, Kyoto (JP); Masuo Oku, Kyoto (JP)

(73) Assignee: Maxell, Ltd., Kyoto (JP)

(*) Notice: Subject to any disclaimer, the term of this patent is extended or adjusted under 35 U.S.C. 154(b) by 183 days.

(21) Appl. No.: 18/699,076

(22) PCT Filed: Oct. 6, 2021

(86) PCT No.: PCT/JP2021/037010
§ 371 (c)(1),
(2) Date: Apr. 5, 2024

(87) PCT Pub. No.: WO2023/058162
PCT Pub. Date: Apr. 13, 2023

(65) Prior Publication Data

US 2024/0430636 A1 Dec. 26, 2024

(51) Int. Cl.
*H04S 7/00* (2006.01)
*G10L 25/51* (2013.01)

(52) U.S. Cl.
CPC .............. *H04S 7/304* (2013.01); *G10L 25/51* (2013.01); *H04S 2400/11* (2013.01); *H04S 2400/13* (2013.01); *H04S 2400/15* (2013.01)

(58) Field of Classification Search
CPC .. H04S 7/304; H04S 2400/11; H04S 2400/13; H04S 2400/15; H04S 2420/01; H04R 1/40; G10L 25/51
See application file for complete search history.

(56) References Cited

U.S. PATENT DOCUMENTS

2003/0095668 A1 5/2003 Wilcock
2012/0114130 A1* 5/2012 Lovitt .................... H04S 7/302
704/E13.011

(Continued)

FOREIGN PATENT DOCUMENTS

JP 2006-227328 A 8/2006
JP 2014-174430 A 9/2014

(Continued)

OTHER PUBLICATIONS

Extended European Search Report received in corresponding to European Patent Application No. 21959904.0, dated Jul. 16, 2025.

(Continued)

*Primary Examiner* — Jason R Kurr
(74) *Attorney, Agent, or Firm* — Rimon P.C.

(57) ABSTRACT

An audio-augmented-reality-object playback device comprises a microphone, an audio playback device to be worn on a listener, and a processor, and the processor is configured to place an audio-augmented-reality-object in a real space, acquire a stereoscopic audio signal from the audio-augmented-reality-object to carry out control for causing the audio playback device to output a sound based on the stereoscopic audio signal, detect a level of a sound in the real space collected by the microphone and a sound source direction of the sound in the real space and correct a placement position of the audio-augmented-reality-object based on a result of the detection so as to separate the placement position of the audio-augmented-reality-object from the sound source direction of the sound in the real space, and carry out control for causing the audio playback device to output the sound based on the stereoscopic sound signal at the placement position as corrected.

19 Claims, 13 Drawing Sheets

(56) References Cited

U.S. PATENT DOCUMENTS

| | | | |
|---|---|---|---|
| 2015/0195641 A1 | 7/2015 | Censo et al. | |
| 2015/0281867 A1 | 10/2015 | Enamito | |
| 2015/0382127 A1 | 12/2015 | Sun et al. | |
| 2016/0012816 A1 | 1/2016 | Fujisawa | |
| 2017/0208415 A1 | 7/2017 | Ojala et al. | |
| 2018/0220250 A1 | 8/2018 | Järvinen et al. | |
| 2019/0394607 A1* | 12/2019 | Laaksonen ............... | H04R 5/04 |

FOREIGN PATENT DOCUMENTS

| | | |
|---|---|---|
| JP | 2015-198297 A | 11/2015 |
| JP | 2018-064227 A | 4/2018 |

OTHER PUBLICATIONS

International Search Report issued in the International Application No. PCT/JP2021/037010 dated Jan. 11, 2022, with English Translation.

* cited by examiner

AUDIO AUGMENTED REALITY OBJECT PLAYBACK DEVICE AND AUDIO AUGMENTED REALITY OBJECT PLAYBACK METHOD

CROSS-REFERENCE TO RELATED APPLICATIONS

This application is the U.S. National Phase under 35 U.S.C. § 371 of International Application No. PCT/JP2021/037010, filed on Oct. 6, 2021, and the entire contents of each of which are hereby incorporated by reference.

TECHNICAL FIELD

The present invention relates to an audio augmented reality object playback device and audio augmented reality playback method.

BACKGROUND ART

Mixed reality (MR), which allows a user to experience the merging of a real space and a virtual space is used as the contents in the fields of games, maintenance, sales promotion, and the like.

As virtual objects making up a virtual space, a display AR (Argument Reality) object created using computer graphics technology, an audio augmented reality object (hereinafter, referred to as an "audio AR object"), and a hybrid object in which a display AR object and an audio AR object are linked to each other have been known. An "audio AR object" is also referred to as a sound AR or an audio AR.

For example, using the mixed reality technology enables a user to hear an audio AR object such as a chirp of a bird in a scenery of a real space, play with a pet that is an AR object in a real space (at home or during a walk), and so on. In the example above, as an audio AR object, the sound of the pet is linked to the display AR object of the pet. Placing the audio AR object in a three-dimensional real space allows the user to hear it stereophonically.

As the audio processing in a three-dimensional space, Patent Literature 1 discloses a stereoscopic audio playback device and a playback method thereof, and Patent Literature 2 discloses a method of detecting a sound source direction.

CITATION LIST

Patent Literature

Patent Literature 1: JP-A-2018-64227
Patent Literature 2: JP-A-2006-227328

SUMMARY OF INVENTION

Technical Problem

In a mixed space involving an audio AR object, overlapping and mixing with sounds in a real space become problems. The sound in the real space such as a noise may prevent the user from hearing the audio AR object, or if the user is absorbed in hearing the audio AR object, he or she may fail to hear the sound in the real space such as the voice from a third party who speaks to the user. These problems become more remarkable, particularly when the audio AR object and the sound source of the sound in the real space are in the same orientation.

However, neither Patent Literature 1 nor Patent Literature 2 mentions the mixing in which the audio AR object overlaps or mixes with the sound in a real space.

The present invention has been made in view of the problems above, and an object of the present invention is to playback an audio AR object while suppressing difficulty in hearing a sound in a real space.

Solution to Problem

In the following, the summary of the representative aspects of the present invention will be briefly stated.

An audio augmented reality object playback device according to the present invention comprises: a microphone an audio playback device to be worn on a left ear side and a right ear side of a listener; and a processor connected to each of the microphone and the audio playback device, the processor being configured to: place an audio augmented reality object in a real space; acquire a stereoscopic audio signal from the audio augmented reality object to carry out control for causing the audio playback device to output a sound based on the stereoscopic audio signal; detect a level of a sound in the real space collected by the microphone and a sound source direction of the sound in the real space and correct a placement position of the audio augmented reality object based on a result of the detection so as to separate the placement position of the audio augmented reality object from the sound source direction of the sound in the real space; and carry out control for causing the audio playback device to output the sound based on the stereoscopic sound signal at the placement position as corrected.

An audio augmented reality object playback method according to the present invention comprises the steps of: placing an audio augmented reality object in a real space; acquiring a stereoscopic audio signal from the audio augmented reality object to carry out control for causing an audio playback device to output a sound based on the stereoscopic audio signal; detecting a level of a sound in the real space collected by a microphone and a sound source direction of the sound in the real space and correcting a placement position of the audio augmented reality object based on a result of the detection so as to separate the placement position of the audio augmented reality object from the sound source direction of the sound in the real space; and carry out control for causing the audio playback device to output the sound based on the stereoscopic sound signal at the placement position as corrected.

Advantageous Effects of Invention

According to the present invention, it is possible to playback an audio AR object while suppressing difficulty in hearing a sound in a real space. The problems, configurations, and advantageous effects other than those described above will be clarified by the description of the embodiments below.

DESCRIPTION OF EMBODIMENTS

Hereinafter, the embodiments of the present invention will be described with reference to the drawings. Throughout all the drawings, the components having the same functions are provided with the common reference signs, and the repetitive explanation therefor will be omitted. In the following, an audio augmented reality object will be referred to as an "audio AR object".

The audio playback technology according to the present invention contributes to "Goal 9: Industry, Innovation, and Infrastructure" of the Sustainable Development Goals (SDGs) proposed by the United Nations.

First Embodiment of Invention

The first embodiment of the present invention will be described with reference to FIG. 1 to FIG. 4.

Figure 1:
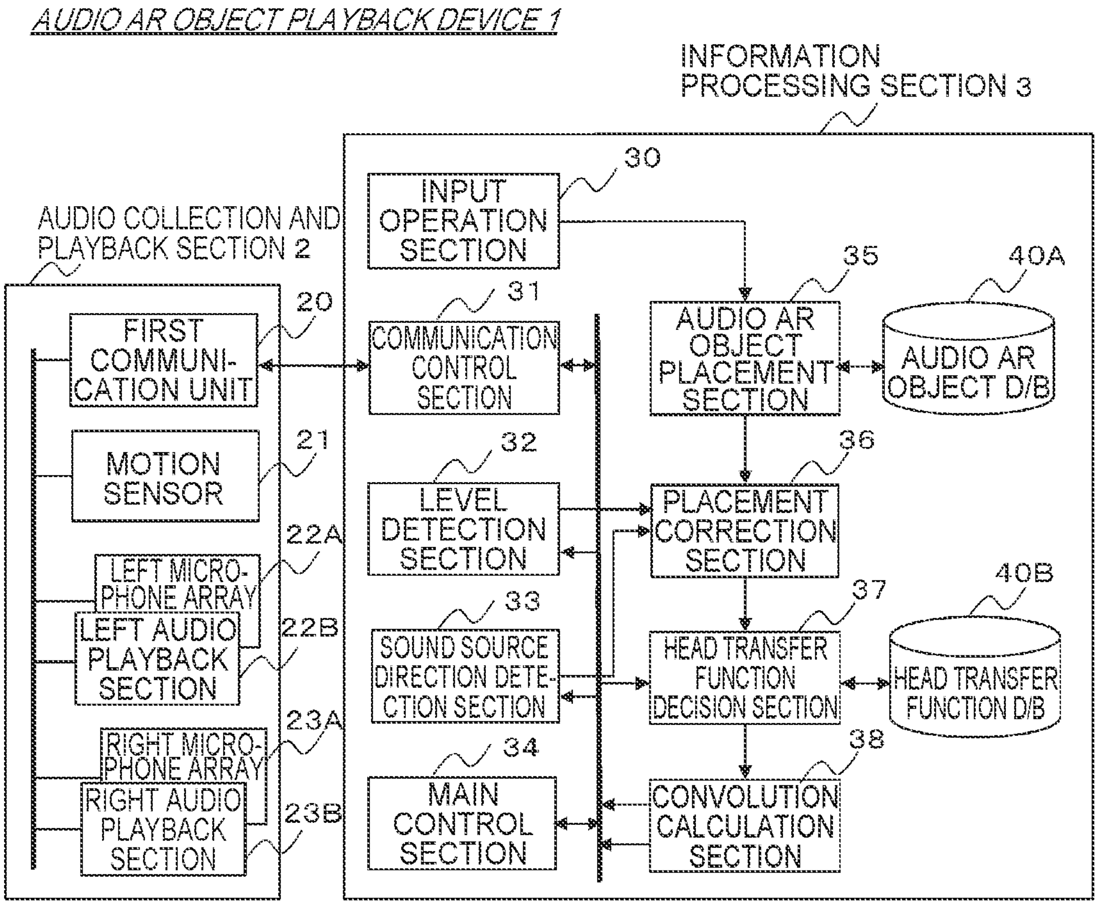
FIG. 1 is a functional block diagram of an audio AR object playback device according to the first embodiment.

FIG. 1 is a functional block diagram of an audio AR object playback device according to the first embodiment.

An audio AR object playback device 1 illustrated in FIG. 1 includes an audio collection and playback section 2 and an information processing section 3.

The audio collection and playback section 2 is configured with a microphone and an audio playback device as one body, which is, for example, a headphone with a microphone or an earphone with a microphone.

The audio collection and playback section 2 includes a first communication unit 20, a motion sensor 21, a left microphone array 22A, a left audio playback section 22B, a right microphone array 23A, and a right audio playback section 23B.

The left microphone array 22A and the left audio playback section 22B are to be attached to the left side of an MR listener (also referred to as a listener), and the right microphone array 23A and the right audio playback section 23B are to be attached to the right side of the listener.

The information processing section 3 may be a mobile information terminal such as a smartphone or a tablet, or configured with a wearable terminal such as a smartwatch.

The information processing section 3 includes an input operation section 30, a communication control section 31, a level detection section 32, a sound source direction detection section 33, a main control section 34, an audio AR object placement section 35, a placement correction section 36, a head transfer function decision section 37, a convolution calculation section 38, an audio AR object D/B 40A, and a head transfer function D/B 40B. Note that "D/B" is an abbreviation of a database.

In the audio collection and playback section 2, the left audio playback section 22B is to be attached to the left ear of a listener of the audio AR object in an MR space, and the right audio playback section 23B is to be attached to his or her right ear. The audio collection and playback section 2 is of the semi-closed type or open (open air) type, which enables the listener to listen to the sounds in which a stereophonic sound played based on a stereophonic audio signal of an audio AR object and a sound in the real space are mixed.

In the case where the audio collection and playback section 2 is an air-conduction headphone which allows a listener to hear an air-conduction sound transmitted due to, for example, vibration of air, it is worn so as to touch the surfaces of the ears, and in particular, if the audio collection and playback section 2 is an open ear headphone, it is worn without completely blocking the ears. In this case, an environment sound comes into the ears via around the headphone, which causes the environment sound to be picked up and heard. In the case where the audio collection and playback section 2 is a bone-conduction headphone which allows a listener to hear a bone conduction sound transmitted due to vibration of the bones, it is worn without blocking the ears at all, which causes an environment sound to enter the ears as it is and is heard.

The audio collection and playback section 2 may be either an air conduction type or a bone conduction type. The left microphone array 22A and the right microphone array 23A are positioned close to the left audio playback section 22B and the right audio playback section 23B, respectively, and collect the sounds in the real space to be heard via the left ear and the right ear.

The motion sensor 21 detects the motion of the head of the listener, thereby detecting the orientation in which the listener faces in the real space.

The motion sensor 21 is configured with, for example, a gyro sensor, a geomagnetic sensor, or an acceleration sensor, neither of which is not illustrated herein.

The gyro sensor is the sensor for detecting an angular velocity of a rotation direction, thereby detecting the state of the posture in the longitudinal, lateral, and oblique directions.

The geomagnetic sensor is the sensor for detecting the magnetic force of the earth, thereby detecting the direction in which the main body of the audio collection and playback section 2 faces.

The acceleration sensor is the sensor for detecting the acceleration which is the change in the speed per second, thereby detecting the motion, vibration, impact, and the like.

Using the gyro sensor or the geomagnetic sensor, possibly further using together with the acceleration sensor, enables detection of the motion of the head of the listener. In particular, using a three-axis geomagnetic sensor capable of detecting the geomagnetism in the upper and lower direction in addition to the front and rear direction and the left and right direction enables detection of the change in the geomagnetism with respect to the motion of the head, thereby enhancing the accuracy in the detection of the motion of the head.

The first communication unit 20 communicates with the information processing section 3. The first communication unit 20 receives stereoscopic audio signals to be played by the left audio playback section 22B and the right audio playback section 23B from the information processing section 3. Furthermore, the first communication unit 20 transmits microphone array signals collected by the left microphone array 22A and the right microphone array 23A and detection signals detected by the motion sensor 21 to the information processing section 3.

The first communication unit 20 is typically an electronic tag, but is not limited thereto. For example, it may be Bluetooth (registered trademark), IrDA (Infrared Data Association), Zigbee (registered trademark), HomeRF (Home Radio Frequency, registered trademark), and wireless LAN (IEEE802.11a, IEEE802.11b, IEEE802.11g). Wireless communication is used herein to improve the usability, but of course, wired communication may be used.

When the listener manipulates the input operation section 30, the audio AR object placement section 35 of the information processing section 3 places the audio AR object in the real space in accordance with his or her manipulation to form an MR space. The audio AR object is selected from the audio AR object D/B 40A.

The level detection section 32 and the sound source direction detection section 33 accept the microphone array signals received by the communication control section 31 as an input, and the level detection section 32 detects the volume of the sound in the real space, and when the volume is more than a predetermined level, notifies the placement correction section 36 of the fact. The sound source direction detection section 33 detects the sound source direction of the sound in the real space and notifies the placement correction section 36 of the sound source direction as detected.

The placement correction section 36 corrects the placement of the audio AR object when a level difference between the sound in the real space and the sound of the audio AR object is relatively small to such an extent that confusion of the sounds occurs and the sound source direction of the sound in the real space overlaps the audio AR object, so as to prevent the sound in the real space and the sound of the audio AR object from overlapping each other. The level difference which is "relatively small to such an extent that confusion of the sounds occurs" will be described later.

The head transfer function decision section 37 decides the head transfer function based on the placement position of the audio AR corrected as necessary and the orientation in which the listener faces. The head transfer function can be obtained by searching the head transfer function D/B 40B or calculated based on the head transfer function obtained by searching the head transfer function D/B 40B.

The convolution calculation section 38 performs convolution calculation or equivalent calculation on the head transfer function and the sound signal of the audio AR object to obtain a stereoscopic sound signal, and transmits the stereoscopic sound signal to the audio collection and playback section 2 via the communication control section 31.

The main control section 34 controls the operations of the information processing section 3 such as timing of each section.

Figure 2A:
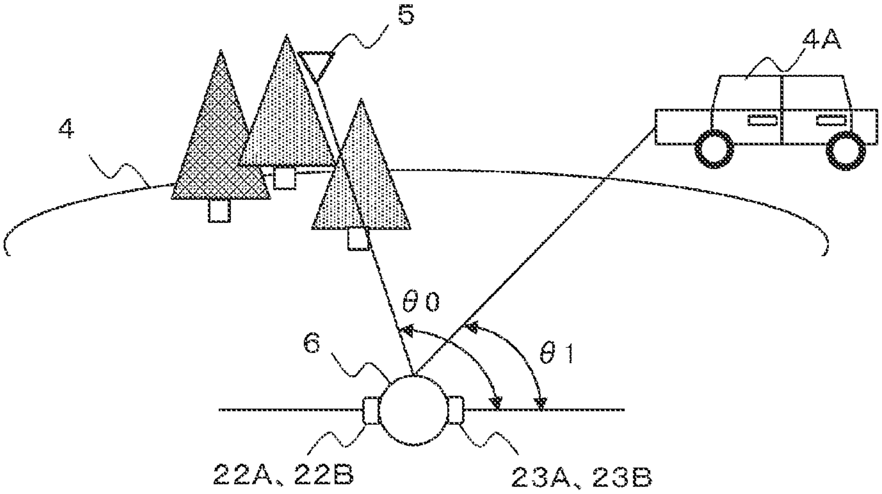
FIG. 2A illustrates a mixed reality space formed by placing an audio AR object in a real space.

FIG. 2A illustrates a mixed reality space formed by placing an audio AR object in a real space.

In FIG. 2A, a real space 4 includes a sound source 4A of a sound in the real space 4 and an audio AR object 5, and a listener 6 is listening to the sound of the sound source 4A and the sound of the audio AR object 5.

The audio collection and playback section 2 is worn to the head of the listener 6, and the left microphone array 22A and the left audio playback section 22B, and the right microphone array 23A and the right audio playback section 23B are attached to his or her left and right ears, respectively. When viewed from the listener 6, a placement position direction θ0 of the audio AR object 5 and a direction θ1 of the sound source 4A of the sound in the real space 4 are separated from each other, and thus confusion of the sounds does not occur.

Here, occurrence of the "confusion of sounds" is determined when a level difference between the level of the sound of the sound source 4A in the real space 4 and the level of the sound of the audio AR object 5 is less than a predetermined level difference, and also when the placement position direction θ0 of the audio AR object 5 is included in the same direction range preset to determine that the placement position direction θ0 is the same as the direction θ1 of the sound source 4A with respect to the listener 6. The same direction range is defined to the range from a margin angle −θmg to +θmg with the direction θ1 as the center.

Note that FIG. 2A illustrates that the direction of the sound source 4A of the sound in the real space 4 as viewed from the listener 6 is detected based on the positions of the left microphone array 22A and right microphone array 23A and is converted into a value where the listener 6 is positioned at the center.

Figure 2B:
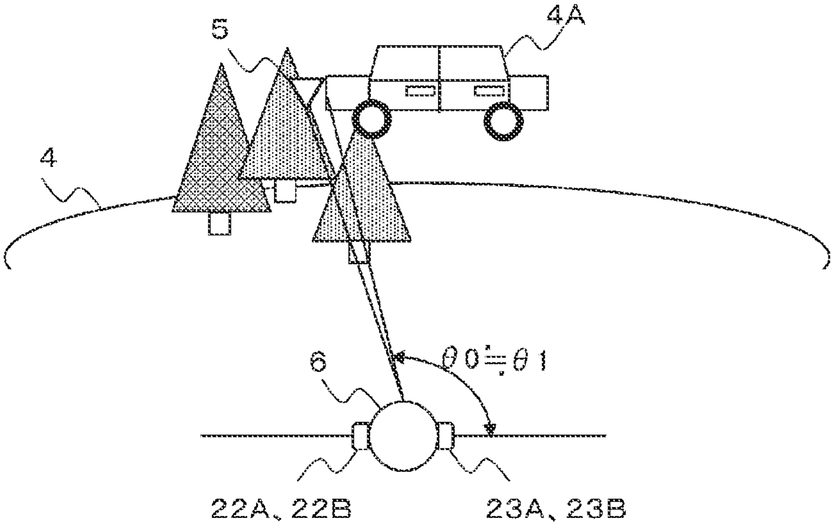
FIG. 2B illustrates a situation in which confusion of sounds occurs.

FIG. 2B illustrates a situation in which confusion of sounds occurs. The situation illustrated in FIG. 2B shows that the sound source 4A of the sound in the real space is approaching the audio AR object 5 and thus confusion of the sounds occurs between the audio AR object 5 and the sound in the real space. In this situation, when viewed from the listener 6, the direction of the audio AR object 5 overlaps the direction of the sound source 4A of the sound in the real space. This causes the sound of the audio AR object to be confused with the sound in the real space.

Figure 2C:
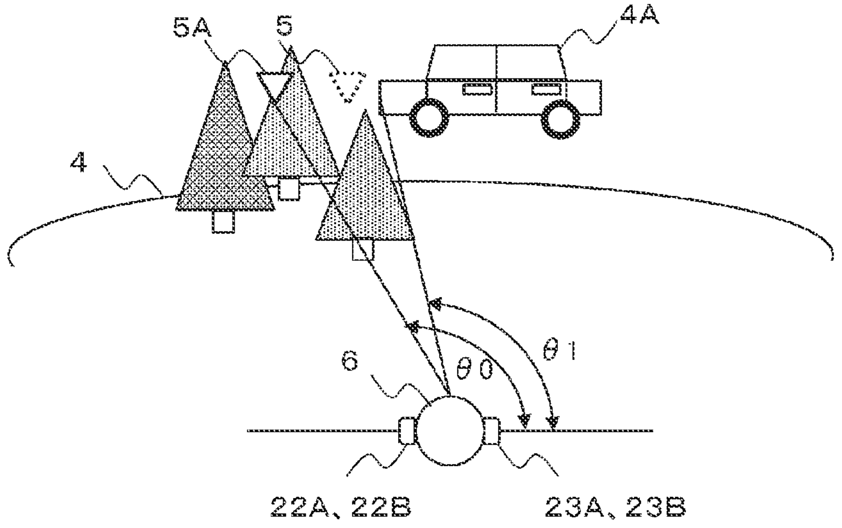
FIG. 2C is a diagram for explaining a case of correcting the placement of an audio AR object.

FIG. 2C illustrates correction of the placement of the audio AR object 5. Correcting the placement of the audio AR object 5 in the situation where the sound source 4A of the sound in the real space overlaps the audio AR object 5 as described for FIG. 2B to a placement position 5A can avoid the confusion of the sound of the audio AR object 5 and the sound in the real space.

Figure 3:
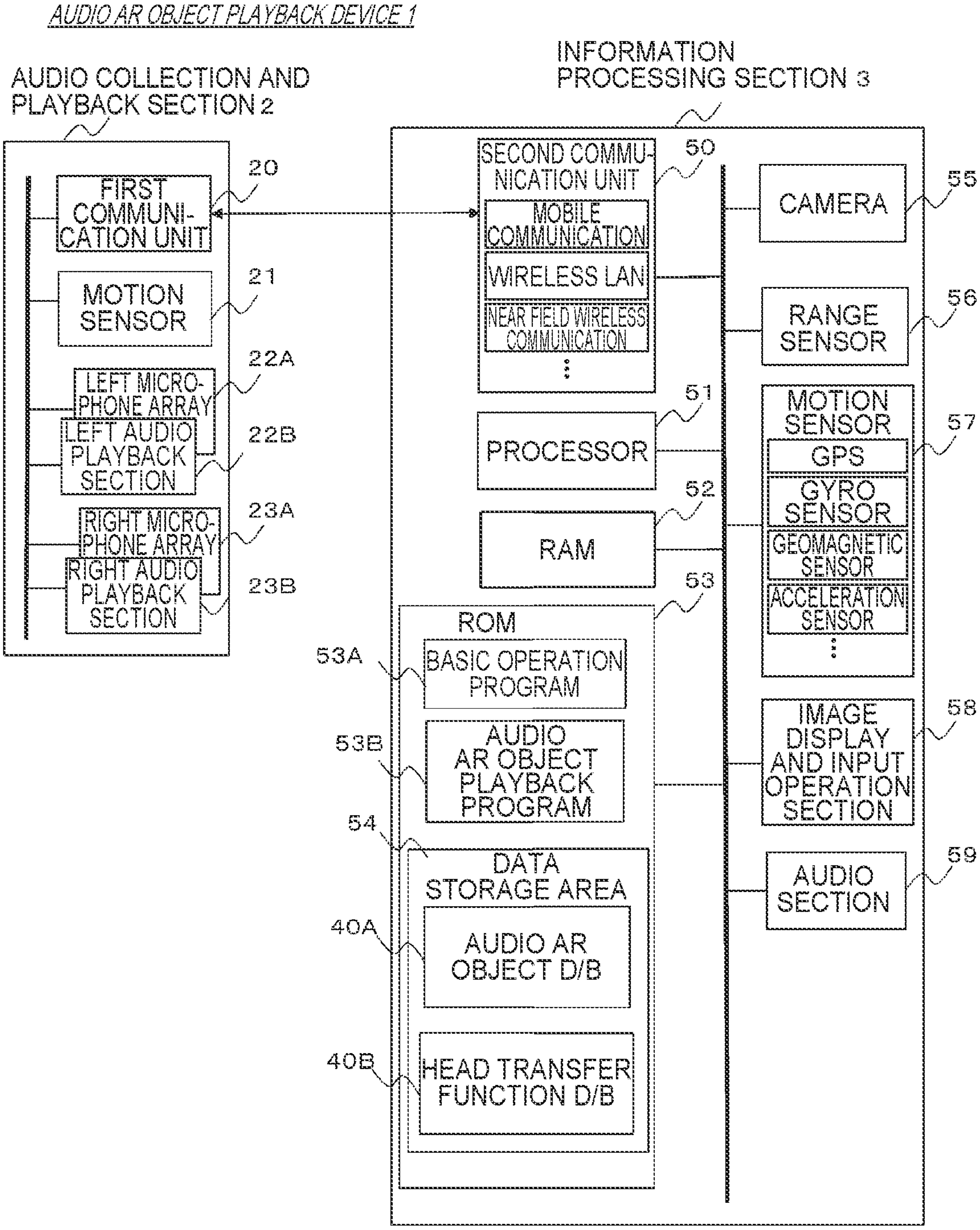
FIG. 3 is a hardware configuration diagram of an audio AR object playback device.

FIG. 3 is a hardware configuration diagram of the audio AR object playback device 1.

The audio AR object playback device 1 is configured with the audio collection and playback section 2 and the information processing section 3 which are connected by communication.

For example, the audio collection and playback section 2 is a non-closed wireless earphone and the information processing section 3 is a mobile information terminal such as a smartphone which is held and used by a listener.

The audio collection and playback section 2 is configured as described with reference to FIG. 1. Furthermore, the first communication unit 20 supports near field communication, which allows the audio collection and playback section 2 to be used by pairing with the information processing section 3.

The information processing section 3 includes a second communication unit 50, a processor 51 (processor 51 corresponds to processor), a RAM 52, ROM 53, a camera 55, a range sensor 56, a motion sensor 57, an image display and input operation section 58, and an audio section 59.

The second communication unit 50 supports, in addition to mobile communication and wireless LAN protocols, near field communication and the like. Mobile communication and wireless LAN can be used for connection to external networks to download the audio AR object 5 and a head transfer function from external servers and the like.

The processor 51 is configured with, for example, a CPU (Central Processing Unit) and the like.

The information processing section 3 also includes the RAM 52 and the ROM 53.

The ROM 53 includes an area for storing the processing programs for a basic operation program 53A and an audio AR object playback program 53B, and a data storage area 54 for storing data necessary for the processing of placement of the audio AR object 5.

The data storage area 54 includes the audio AR object D/B 40A and the head transfer function D/B 40B. The data storage area 54 may store data necessary for executing the basic operation program 53A and the audio AR object playback program 53B.

The processor 51 loads the basic operation program 53A and the audio AR object playback program 53B in the RAM 52 to execute them.

A listener holds the information processing section 3 and captures a real space using the camera 55. At the same time, the range sensor 56 measures the distance from the real space.

The range sensor 56 is the sensor that emits radio waves, light waves, ultrasonic waves, and the like to detect reflected waves from an object, thereby detecting the distance from the object, direction of the object, and relative speed of the object.

Using the range sensor 56 allows the distance to an object around the listener 6, relative speed of the object, and direction in which the object is present, to be detected based on the position of the listener 6.

The image display and input operation section 58 is a flat display on which a touch sensor is laminated. A camera image is displayed on the flat display of the image display and input operation section 58, which allows the listener 6 to touch a portion of the display screen to specify a location where the audio AR object 5 is to be placed.

At the placement location as specified, distance data has been accompanied, which allows the real space 4 to be treated as a three-dimensional space and the audio AR object 5 to be placed therein.

Figure 4:
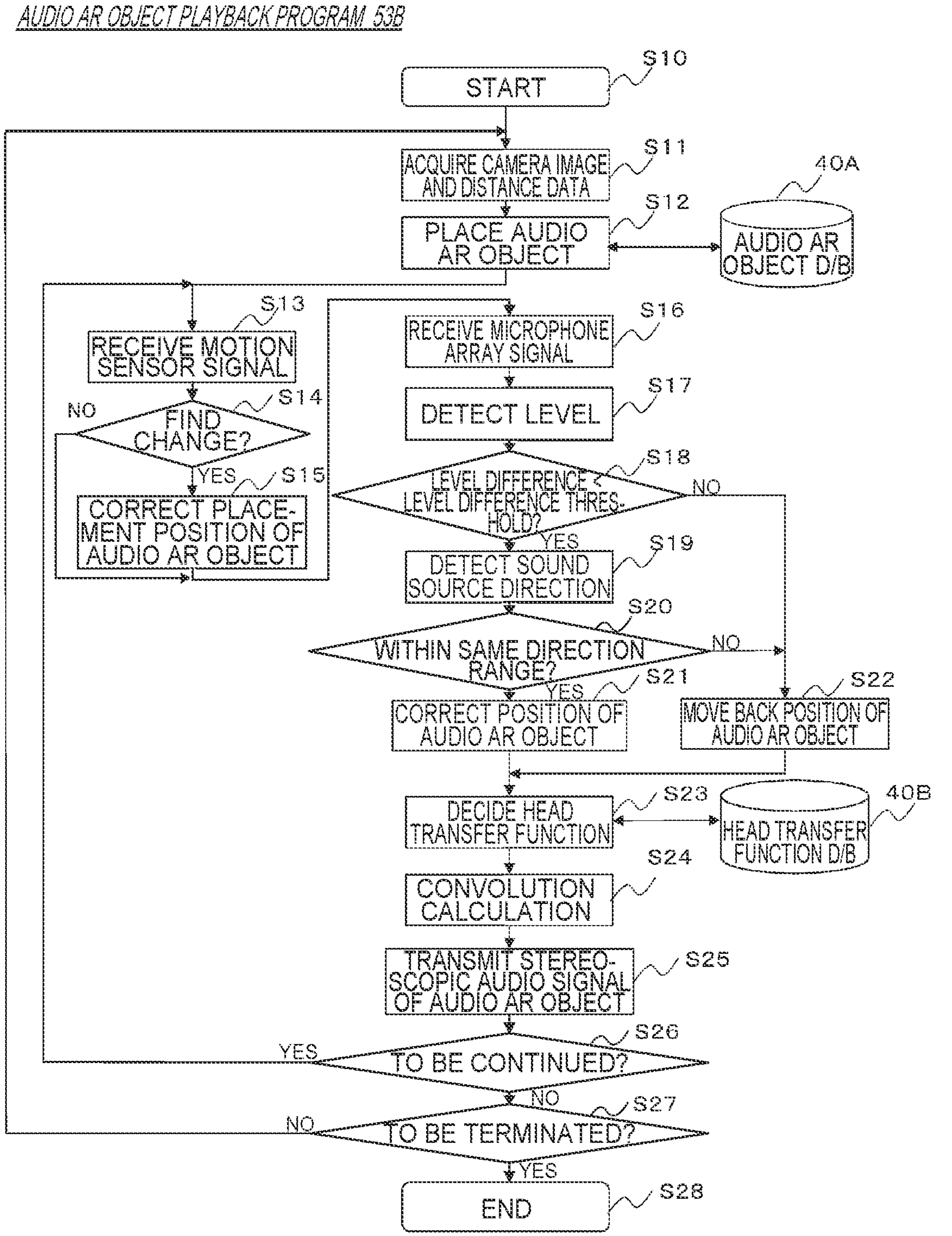
FIG. 4 illustrates a flowchart of a flow of the processing carried out by an audio object playback device according to the first embodiment.

Next, exemplified processing details carried out by the processor 51 of FIG. 1 and FIG. 3 will be described with reference to FIG. 4. FIG. 4 illustrates a flowchart of a flow of the processing carried out by the audio object playback device according to the first embodiment.

Upon start of the program (step S10), the processor 51 acquires a camera image and distance data (step S11).

The listener 6 selects an audio AR object from the audio AR object D/B 40A, and the processor 51 places the audio AR object at the position specified in the camera image (step S12).

The processor 51 receives a motion sensor signal from the audio collection and playback section 2 (step S13), detects whether the direction in which the listener 6 faces changes (step S14), and corrects the placement position of the audio AR object 5 (step S15) when detecting the change (step S14: YES).

The information processing section 3 receives a microphone array signal from the audio collection and playback section 2 (step S16). The level detection section 32 detects the level of the microphone array signal (step S17).

The processor 51 calculates a level difference between the audio signal level of the audio AR object 5 and the level of the microphone array signal. When the level difference is less than a predetermined level difference threshold set as a first condition for determining that the confusion of sounds has occurred (step S19: YES), the sound source direction detection section 33 detects the sound source direction of the sound in the real space 4 (step S19). A second condition for determining that the confusion of sounds has occurred is the direction identity between the sound source direction of the sound in the real space 4 and the direction of the audio AR object 5. The second condition herein is satisfied not only when the directions are the same, but also when the direction of the audio AR object 5 is included in the range in which the direction of the audio AR object 5 can be determined the same as the sound source direction of the sound in the real space 4.

The processor 51 corrects the placement position of the audio AR object 5 (step S21) when the level difference is less than the level difference threshold in step S18 (step S19: YES) and also the direction identity has been found, in other words, the source direction approximately overlaps the audio AR object 5 (step S20: YES).

The processor 51 moves the audio AR object 5, if the position thereof was corrected, to the position before the placement correction when the level difference is equal to or more than the level difference threshold (step S18: NO), or when no direction identity has been found (step S20: NO). The processor 51 leaves the audio AR object 5 at that position if it was not corrected (step S22).

The processor 51 uses the head transfer function D/B 40B to decide the head transfer function.

The processor 51 carries out the convolution calculation or an equivalent calculation on the head transmission function as decided and the audio signal of the audio AR object (step S24) to three-dimensionally reconfigure a stereoscopic audio signal of the audio AR object 5, and transmits it to the audio collection and playback section 2 (step S25).

When the program is to be continued as the listener keeps listening to the stereoscopic audio signal (step S26: YES), the processor 51 returns to step S13.

If a negative determination is made in step S26, the processor 51 makes a termination determination (step S27). When placement of an audio AR is to be newly executed (step S27: NO), the processor 51 returns to step S11. If a positive determination is made in the termination determination (step S27: YES), the processor 51 terminates the program (step S28).

In addition to the configuration described above, the left microphone array 22A, the right microphone array 23A, the camera 55, and the range sensor 56 mounted on the audio AR object playback device 1 may be used to measure an object that is a sound source of a sound in the real space 4 approaching the listener 6, the position of the sound source, the orientation of the sound from the sound source to the listener 6, the volume of the sound, and the like. This enables detection of the sound in the real space 4 with higher accuracy. Based on the result of this detection, control of the stereo image of the audio AR object 5 with high accuracy so as to prevent the sound in the real space 4 heard by the listener 6 from being interfered by the sound of the audio AR object 5, or prevent the sound of the audio AR object 5 heard by the listener 6 from being interfered by the sound in the real space 4.

The audio collection and playback section 2 of a semi-closed type or an open type has been described so far, however, of course, there is no problem even if it is of a closed type.

As described above, in the audio AR object playback device for mixed reality and the playback method according to the first embodiment of the present invention, even in the confusion of the sounds between the audio AR object and the sound in the real space, separating the audio AR object and the sound in the real space from each other enables a listener to easily hear the sounds.

Second Embodiment of Invention

A second embodiment of the present invention will be described with reference to FIG. 5 to FIG. 7.

Figure 5:
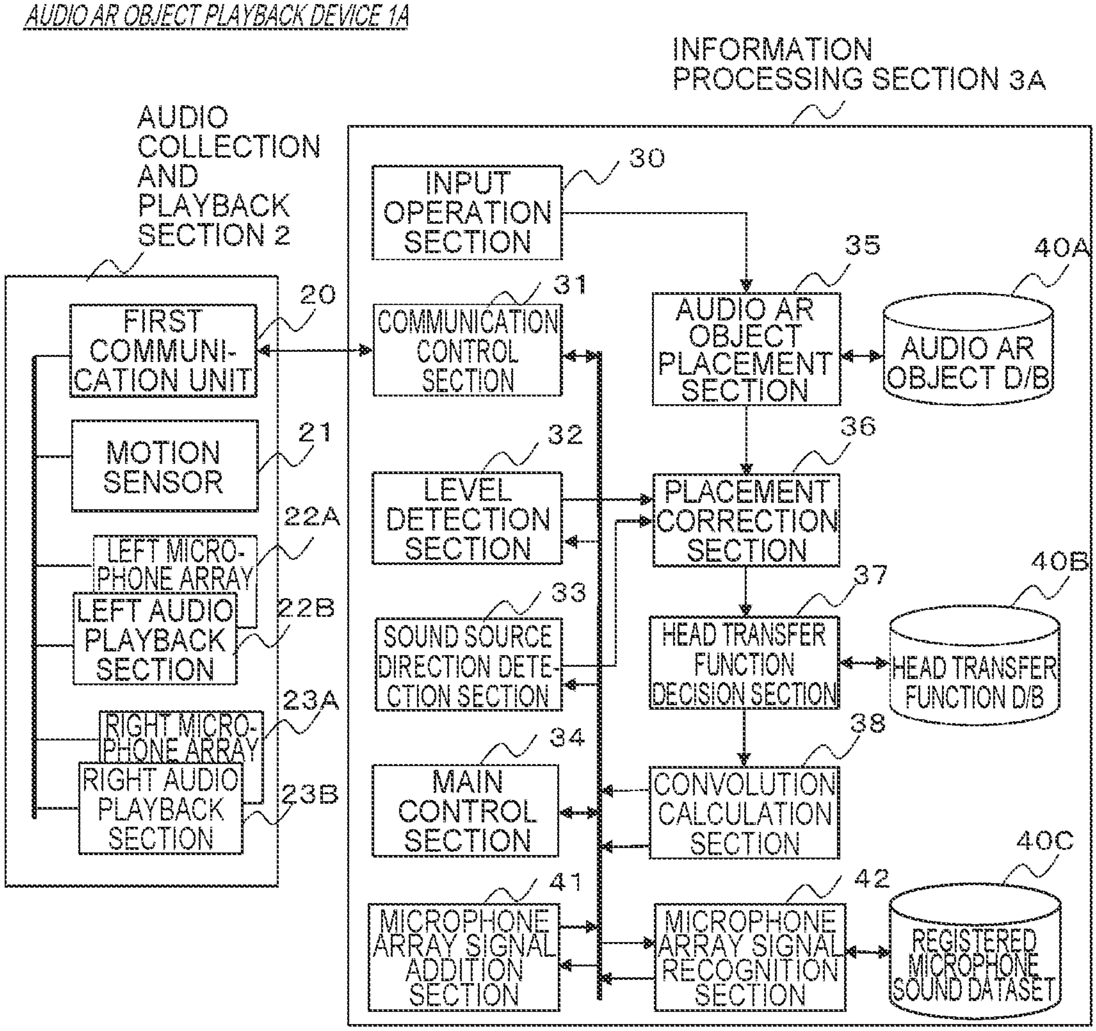
FIG. 5 is a functional block diagram of an audio AR object playback device according to the second embodiment.

FIG. 5 is a functional block diagram of an audio AR object playback device according to the second embodiment.

The audio AR object playback device 1A illustrated in FIG. 5 is configured with the audio collection and playback section 2 and an information processing section 3A which are connected by communication. The information processing section 3A includes, in addition to the components of the information processing section 3 according to the first embodiment, a microphone array signal addition section 41, a microphone array signal recognition section 42, and a registered microphone sound dataset 40C. In the present embodiment, the audio collection and playback section 2 according to the present embodiment is a closed wireless headphone or a closed wireless earphone.

In the registered microphone sound dataset 40C, sound data to be delivered to the listener 6 as a sound in the real space 4 (for example, voice patterns of humans, siren of an ambulance, a car horn, a bicycle bell, etc.) are stored in advance as datasets. The microphone array signal recognition section 42 analyzes a microphone array signal (for example, by the audio analysis processing based on an FFT analysis and the audio recognition processing based on the comparison of audio components). When it is recognized that the microphone array signal matches a part of the registered sound datasets, the microphone array signal is added to the stereoscopic sound signal by the microphone array signal addition section 41 and transmitted to the audio collection and playback section 2. In addition, the microphone array signal recognition section 42 may be configured to determine whether the microphone array signal is a voice of a human, and add the microphone array signal to the stereoscopic sound signal when it is.

In the audio collection and playback section 2 of a closed type, a listener has the difficulty in directly hearing a sound in the real space. In the present embodiment, however, when the sound matches the sound data that has been registered as it is considered important, the sound is added to a stereoscopic sound signal so that a listener can hear it through the left sound playback section 22B and right sound playback section 23B.

Figure 6:
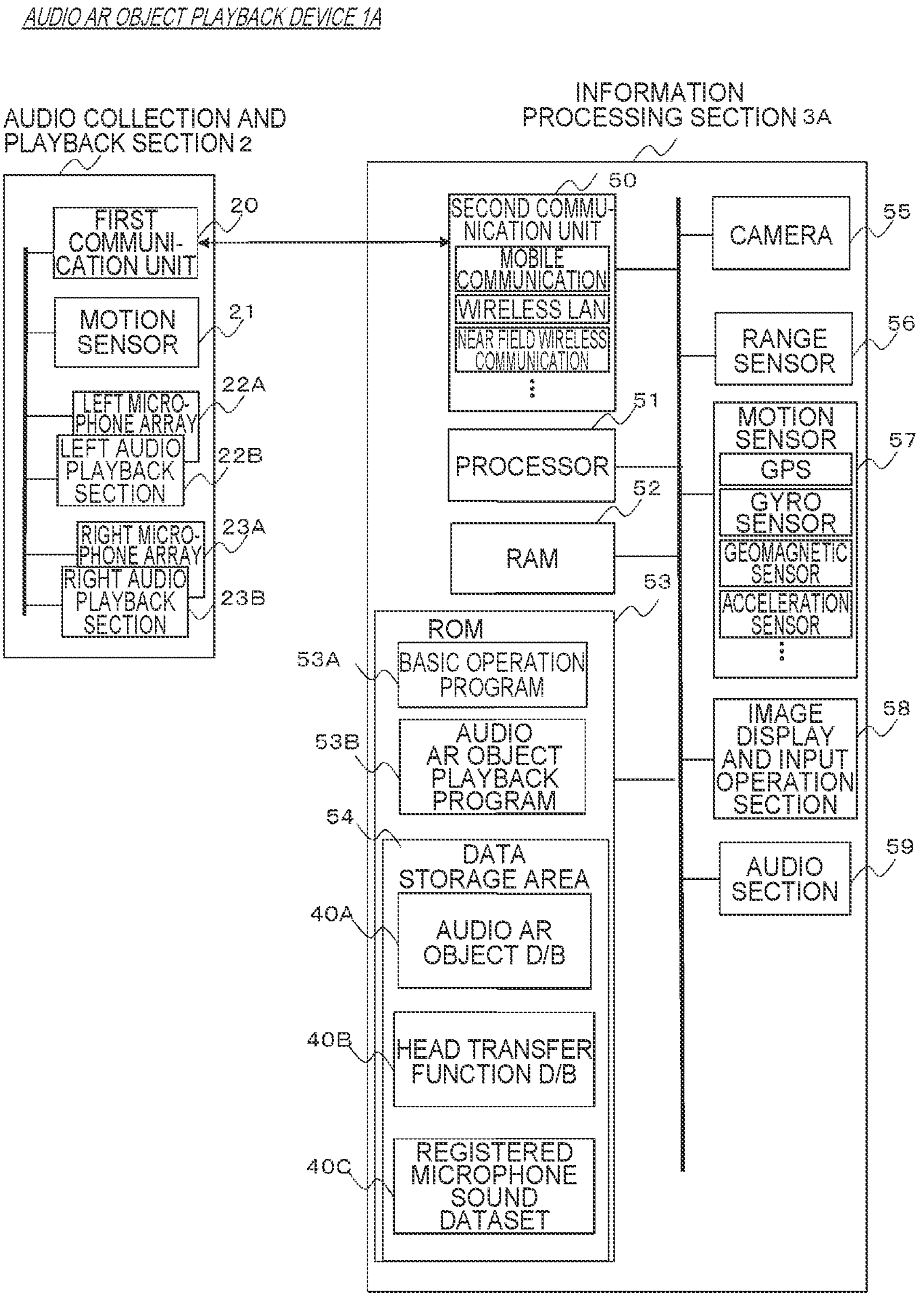
FIG. 6 is a hardware configuration diagram of an audio AR object playback device 1A according to the second embodiment.

FIG. 6 is a hardware configuration diagram of the audio AR object playback device 1A according to the second embodiment.

In the information processing section 3A illustrated in FIG. 6, the registered microphone sound dataset 40C is added to the data storage area 54.

Next, an audio AR object playback processing according to the second embodiment will be described with reference to FIG. 7. FIG. 7 illustrates a flowchart of a flow of the processing carried out by the audio object playback device according to the second embodiment.

Figure 7:
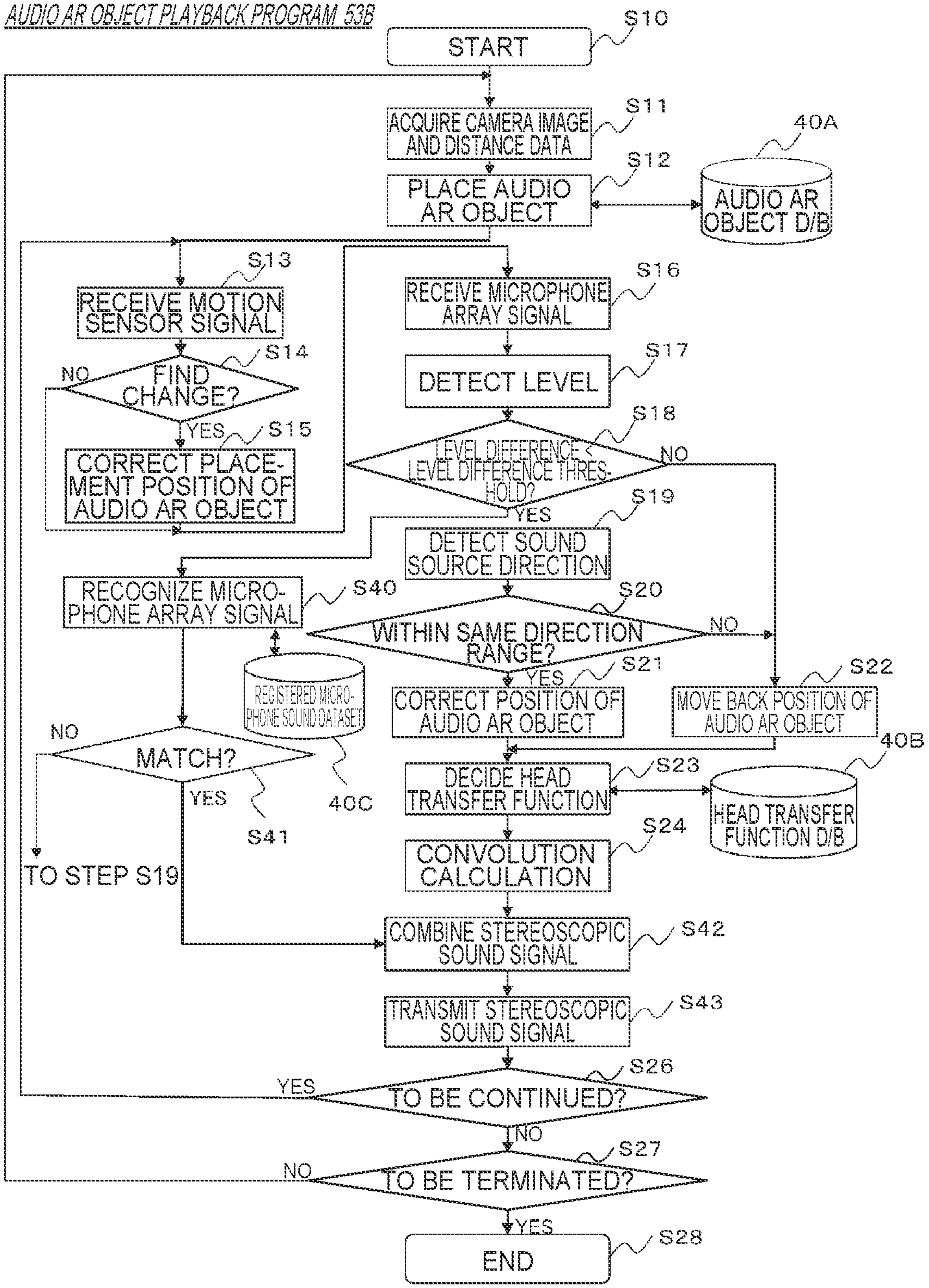
FIG. 7 illustrates a flowchart of a flow of processing carried out by an audio object playback device according to the second embodiment.

The flowchart illustrated in FIG. 7 includes, in addition to the flowchart of the audio AR object playback program 53B illustrated in FIG. 4, steps S40 to S42 and the registered microphone sound dataset 40C, and also includes step S43 in place of step S25.

When the processor 51 makes a positive determination in step S18, in other words, determines that the level difference is less than the level difference threshold (step S18: YES), the microphone array signal recognition section 42 carries out the audio analysis of a microphone array signal (step S40).

When the processor 51 determines that the microphone array signal matches the registered sound data (step S41: YES), the microphone array signal addition section 41 combines the stereoscopic sound signal and the microphone array signal (step S42). The sound signal as combined is transmitted to the audio collection and playback section 2 from the second communication unit 50 (step S43).

On the other hand, upon determining that the microphone array signal does not match the registered sound data (step S41: NO), the processor 51 returns to step S19.

The case where the stereoscopic audio signal and the microphone array signal are combined in step S42 has been described so far, however, in step S42, the stereoscopic audio signal may be stopped to be output while only the microphone array signal is output. After completion of the output of the microphone array signal, the stereoscopic audio signal is started to be output again.

Furthermore, depending on the result of determination in step S41, change of the placement position of the audio AR object may be differed between the case where the microphone array signal is recognized to correspond to the registered audio data and the case where it is not.

For example, it may be configured that, when the microphone array signal is recognized to correspond to the registered sound data, confusion of the sounds is eliminated by changing the placement position of the audio AR object 5, while, when the microphone array signal is not recognized to correspond to the registered sound data, the placement position of the audio AR object 5 is not changed.

The audio collection and playback section 2 of a closed type has been described so far, however, of course, there is no problem if it is of a non-closed type.

As described above, the audio AR object playback device for mixed reality and the playback method according to the second embodiment of the present invention includes the features which are the same as those of the first embodiment, and also has the features allowing a sound in a real space that enters the ear of the listener 6 to be limited to the one which can be determined as important. This enables the listener 6 to easily concentrate on listening to the stereoscopic sound of the audio AR object 5.

Third Embodiment of Invention

A third embodiment of the present invention will be described with reference to FIG. 8. As the audio AR object playback device according to the present embodiment, the audio AR object playback devices 1, 1A according to the first embodiment and the second embodiment can be employed. The present embodiment may be applied to the cases where the sound source 4A of a sound in the real space 4 and the audio AR object 5 are movable.

Figure 8:
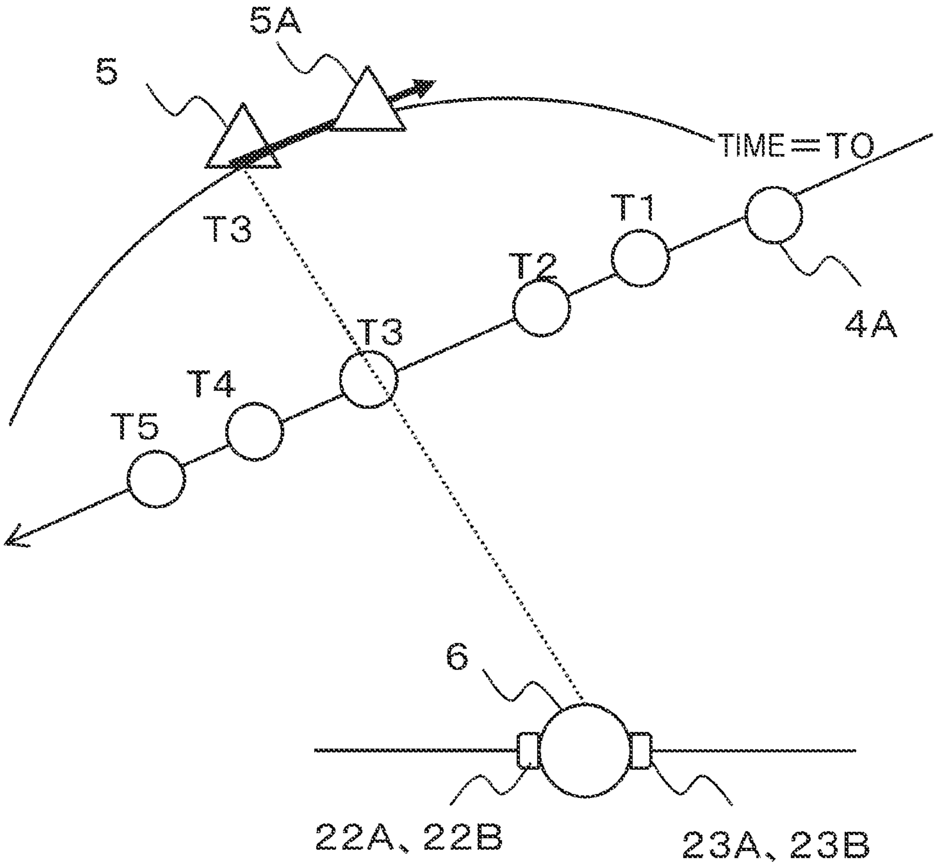
FIG. 8 is a diagram for explaining a case of correcting the placement of an audio AR object in accordance with a movement of a sound source of a sound in a real space.

FIG. 8 is the diagram for explaining the case of correcting the placement of an audio AR object in accordance with the motion of a sound source of a sound in a real space. FIG. 8 illustrates as if only the sound source 4A of the sound in the real space 4 moved, however, it can be considered that the sound source 4A of the sound in the real space 4 and the audio AR object 5 move relative to each other.

The sound source 4A of the sound in the real space 4 moves as the time passes from T0 to T1, T2 . . . , and at time T3, it overlaps the direction between the audio AR object 5 and the listener 6. In order to avoid this overlapping, the placement position of the audio AR object 5 is corrected to a placement position 5A.

Regarding the movement of the sound source 4A of the sound in the real space, the placement correction section 36 refers to a motion vector. The motion vector is composed of the direction and quantity of movement from time T2 to time T3. The direction in which the audio AR object 5 is to be moved to the placement position 5A is opposite to the motion vector, and the larger the quantity of the motion vector is, the less the audio AR object 5 is made to move. Furthermore, the distances to the listener 6 from the position of the audio AR object 5 and from the placement position 5A are made substantially the same. This can make the quantity of the movement of the audio AR object 5 small, thereby reducing the change in the sound volume before and after the placement correction.

As described above, the features of the third embodiment according to the present invention enables the listener 6 to listen to a stereoscopic sound with a little change before and after the placement correction of the audio AR object 5.

Fourth Embodiment of Invention

A fourth embodiment of the present invention will be described with reference to FIG. 9 to FIG. 12.

Figure 9:
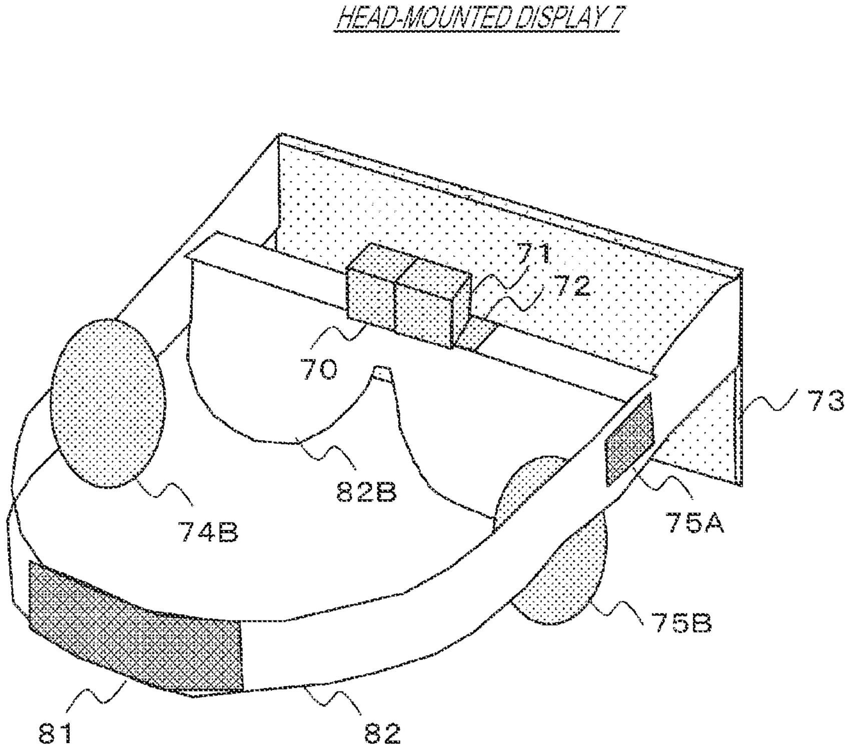
FIG. 9 illustrates the appearance of a head-mounted display which is an embodiment of an audio AR object playback device.

FIG. 9 illustrates the appearance of a head-mounted display 7 which is an embodiment of the audio AR object playback device.

The head-mounted display 7 (hereinafter, abbreviated as an "HMD") illustrated in FIG. 9 includes a camera 70, a range sensor 71, a motion sensor 72, an image display section 73, a left audio playback section 74B, a right audio playback section 75B, a right microphone array 75A, a control section 81, and a holder 82. A left microphone array 74A is on the back side of the holder 82 and thus cannot be seen in FIG. 9. In the HMD 7, the holder 82 is worn on the head of a user of the HMD 7, which causes the image display section 73 to be positioned in front of his or her eyes. The user of the HMD 7 is also the listener 6 of a stereophonic sound, and thus is referred to as the listener 6 in the following.

The image display section 73 may be a semi-transparent screen or a non-transparent display. In the former case, the listener 6 views the background in the front through the semi-transparent screen while, in the latter case, a camera image in which the background in the front is captured is displayed on the non-transparent display, thereby allowing the listener 6 to view the background in the front.

In the case of the image display section 73 having a semi-transparent screen, the listener 6 directly views the background in the front with his or her eyes through an optical combiner including a half mirror.

In the case of the image display section 73 having a non-transparent display, the display is formed with a liquid crystal panel or the like, on which, in accordance with an operation by the listener 6, the real space information on the background in the front and the virtual space information are to be displayed by means of videos, or the notification information provided to the listener 6 and the information on the operation state are displayed. The image display section 73 may be a three-dimensional image display unit.

For example, when output of a sound is started, interrupted, or resumed, the image display section 73 may display a notification thereof to the listener 6. This allows, for example, in case that output of a sound is interrupted or resumed, the listener to know that it is caused by a normal control operation but not by a failure.

The camera 70 is mounted so that the background in front of the line of sight of the listener 6 can be captured, and the range sensor 71 measures the distance from the background. The range sensor 71 is the sensor configured to emit radio waves, light waves, ultrasonic waves, and the like, and detect reflected waves from the object, thereby detecting the distance from the object, direction of the object, and relative speed of the object. Using the range sensor 71 enables detection of the distance to an object around the listener 6, relative speed of the object, and direction in which the object is present based on the position of the listener 6.

The control section 81 takes a camera image captured by the camera 70 and the distance data measured by the range sensor 71, and supplies them to an internal memory or a CPU. The control section 81 also includes a communication unit, and outputs an image to be displayed on the image display section 73 and a sound to be output to the left audio playback section 74B and the right audio playback section 75B.

The control section 81, the camera 70, the range sensor 71, the left audio playback section 74B, the right audio playback section 75B, the left microphone array 74A, and the right microphone array 75A are attached to the holder 82, however, they may not be mounted in the same manner as illustrated in FIG. 9.

Figure 10:
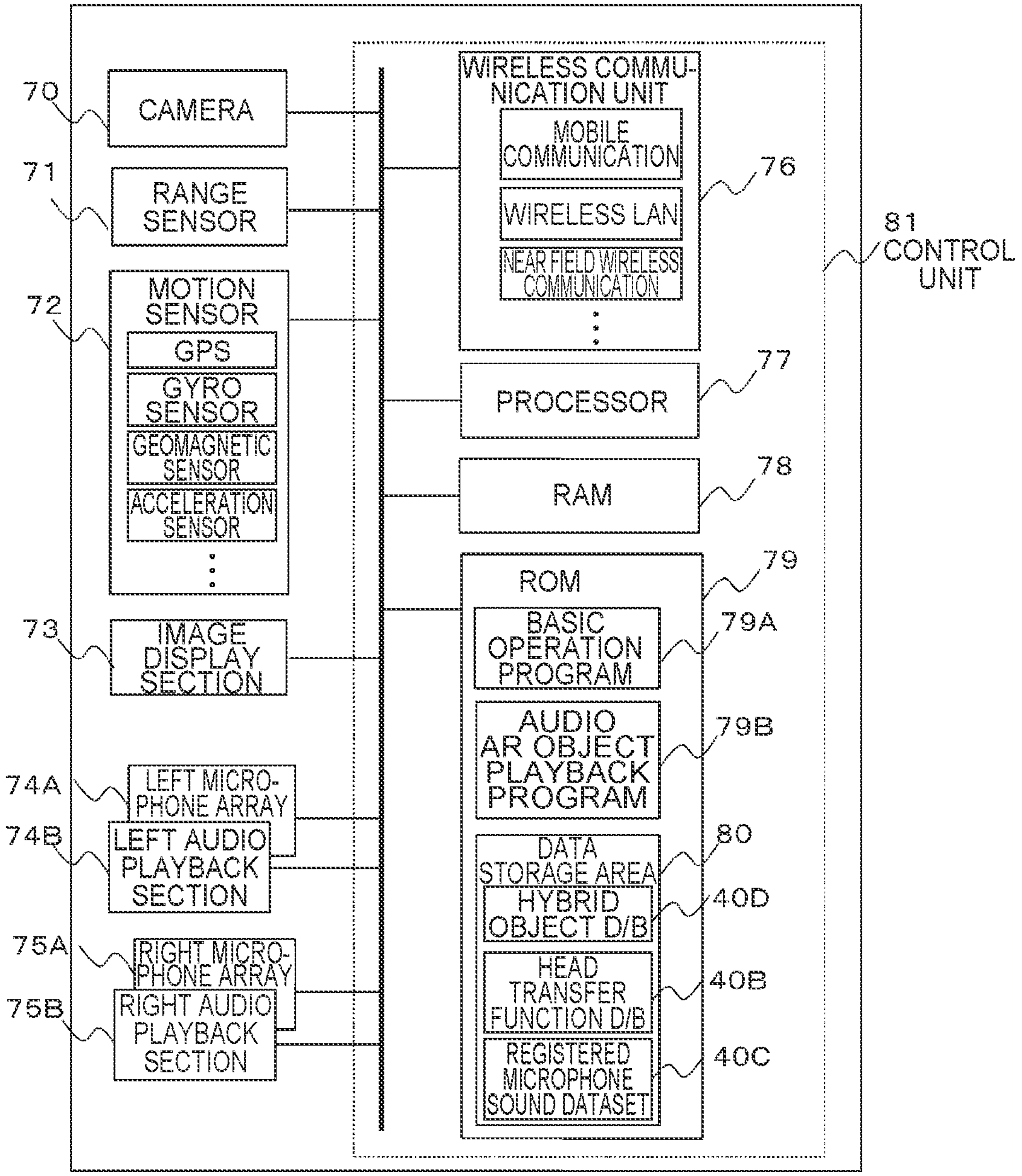
FIG. 10 is a hardware configuration diagram of a head-mounted display.

FIG. 10 is a hardware configuration diagram of the head-mounted display 7.

The HMD 7 illustrated in FIG. 10 includes the camera 70, the range sensor 71, the motion sensor 72, the image display section 73, the left microphone array 74A, the right microphone array 75A, the left audio playback section 74B, the right audio playback section 75B, a wireless communication unit 76, a processor 77, a RAM 78, and a ROM 79.

The wireless communication unit 76 supports, in addition to mobile communication and wireless LAN protocols, near field wireless communication, and the like. Mobile communication and wireless LAN can be used for connection to external networks to download hybrid objects and head transfer functions from external servers and the like. The near field communication may be used for connection to the microphone arrays (74A, 75A) and the audio playback sections (74B, 75B). Note that the near field wireless communication is typically an electronic tag, but is not limited thereto. For example, it may be Bluetooth (registered trademark), IrDA (Infrared Data Association), Zigbee (registered trademark), HomeRF (Home Radio Frequency, registered trademark), and wireless LAN (IEEE802.11a, IEEE802.11b, IEEE802.11g). Here, wireless communication is used to improve the usability, but of course, wired communication may be used.

The processor 77 is configured with a CPU or the like.

The RAM 78 is a volatile memory.

The ROM 79 is configured with a non-volatile memory medium such as a flash ROM, and includes the processing programs for a basic operation program 79A and an audio AR object playback program 79B and a data storage area 80. The data storage area 80 includes a hybrid object D/B 40D, the head transfer function D/B 40B, and the registered microphone sound dataset 40C.

The processing programs of the basic operation program 79A and audio AR object playback program 79B are loaded in the RAM 78 and executed by the processor 77. The data storage area 80 may store the data necessary for executing the basic operation program 79A and the audio AR object playback program 79B.

The control section 81 includes the wireless communication unit 76, the processor 77, the RAM 78, and the ROM 79.

The HMD 7 is worn to the face of the listener 6, and the camera 70 captures a real space in front of the listener 6. At the same time, the range sensor 71 measures the distance from the real space. The listener 6 selects a portion of the real space on which a hybrid object is to be placed.

Next, exemplified flow diagrams of the details of the processing by the control section 81 illustrated in FIG. 9 and FIG. 10 will be described with reference to FIG. 11 and FIG. 12.

Figure 11:
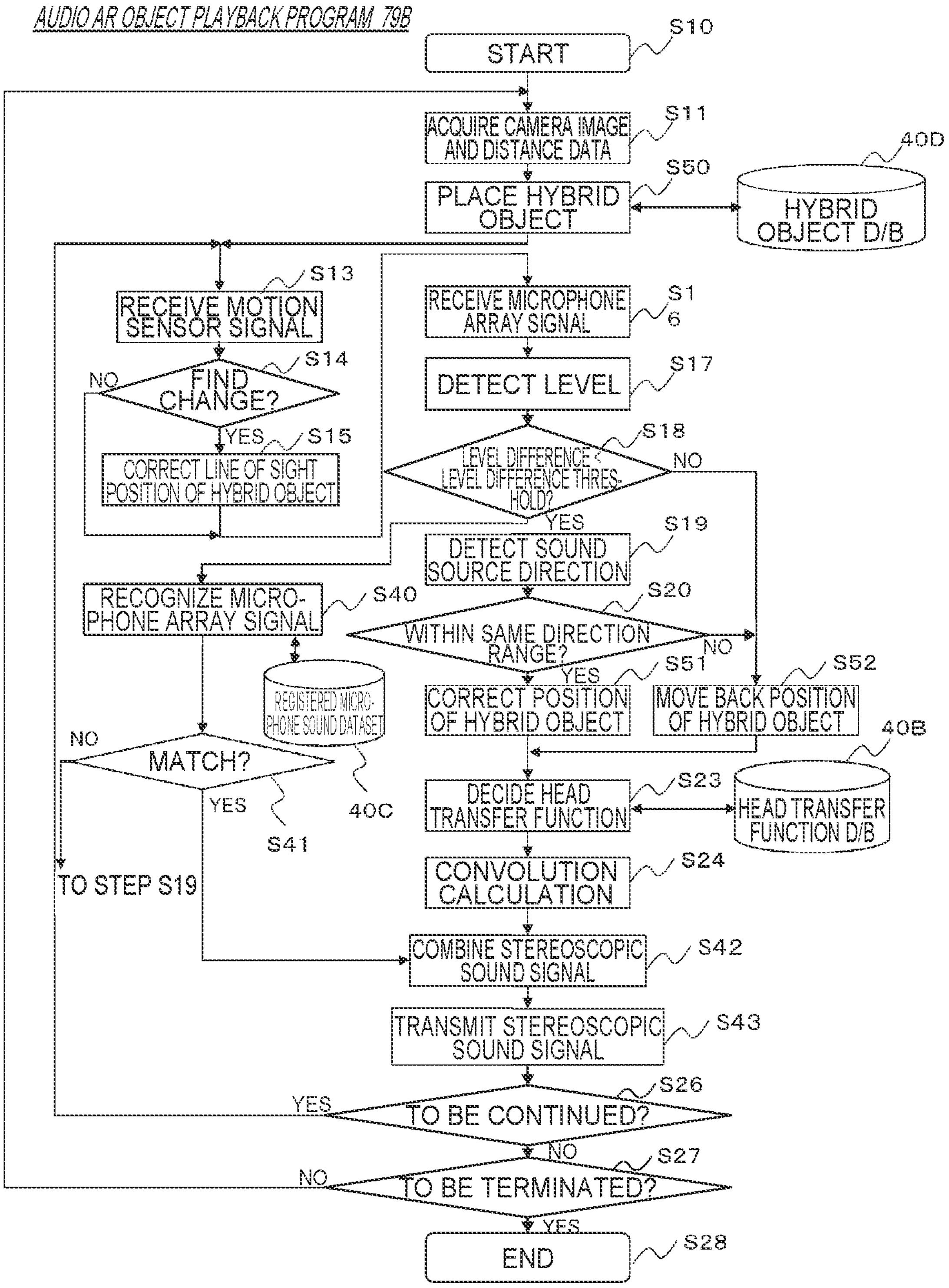
FIG. 11 illustrates a flowchart of a flow of processing carried out by an audio object playback device according to the fourth embodiment.

FIG. 11 illustrates a flowchart of a flow of the processing carried out by the audio object playback device according to the fourth embodiment.

In FIG. 11, the steps in which the processes that are the same as those of the flowcharts of the audio AR object playback program 53B illustrated in FIG. 4 and FIG. 7 are provided with the same reference signs, and the repetitive explanations thereof will be omitted. The present flowchart is for the case of using the audio playback sections of a closed-type, however, the audio playback sections are not limited thereto, and may be the ones of a non-closed type.

The flowchart of FIG. 11 differs from the flowchart of FIG. 7 in that the audio AR object D/B 40A is replaced with the hybrid object D/B 40D, a hybrid object is placed in step S50, the position of the hybrid object is corrected in step S51, and the position of the hybrid object is moved back in step S52. That is, in the present embodiment, an audio AR object in the flowchart of FIG. 7 is replaced with a hybrid object.

Figure 12:
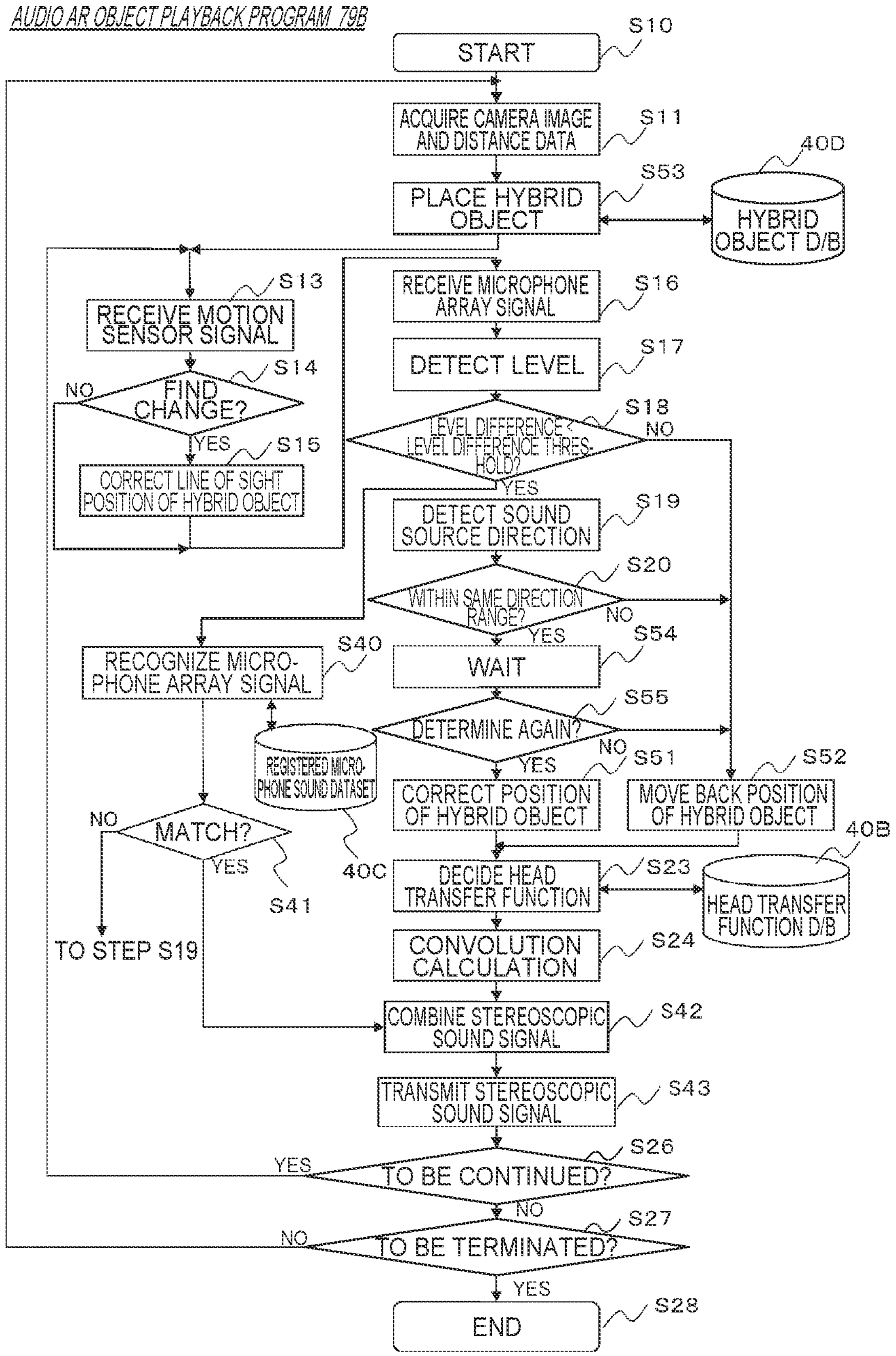
FIG. 12 illustrates a further example of a flowchart of a flow of processing carried out by an audio object playback device according to the fourth embodiment.

FIG. 12 illustrates a flowchart of a further example of the flow of the processing of the audio object playback device according to the fourth embodiment.

In FIG. 12, the steps in which the processes that are the same as those of the flowcharts illustrated in FIG. 11 are provided with the same reference signs, and the repetitive explanations thereof will be omitted. The present flowchart is for the case of using the audio playback sections of a closed-type, however, the audio playback sections are not limited thereto, and may be the ones of a non-closed type.

The flowchart of FIG. 12 differs from the flowchart of FIG. 11 in steps S53, S54, and S55. A hybrid object is an object in which an audio AR object and an AR object are linked to each other. In the first flowchart illustrated in FIG. 11, in step S50, the hybrid object is placed in the real space, in other words, in the world coordinate system fixed to the real space, while in the second flowchart illustrated in FIG. 12, in step S53, the hybrid object is placed in a visual space of the HMD 7, in other words, in the local coordinate system fixed to the HMD 7.

Comparing both the cases, in the former case, the hybrid object moves within the viewing angle of the listener 6 in accordance with the motion of the face of the listener 6, while in the latter case, the position of the hybrid object within the viewing angle is fixed. In other words, in the former case, the hybrid object is the hybrid object placed in the coordinate system of the real space, and thus becomes invisible when the listener 6 moves away from the place. On the other hand, the coordinate system of the real space is as large as the real space, which enables a large amount of hybrid objects to be placed thereon.

In the latter case, the hybrid object is the hybrid object placed in a coordinate system fixed to the HMD 7, and the positional relation with the image display section 73 of the HMD 7 is also fixed. The hybrid object placed in the direction in which the display surface of the image display section 73 is present when viewed from the listener 6 is displayed on the image display section 73. The hybrid object placed in a coordinate system within the range in which the display surface of the image display section 73 is present can be always displayed and allowed to be operated since the image display section 73 is fixed to the coordinate system even if the listener 6 moves while wearing the HMD 7.

Accordingly, when the sound in the real space and the sound of the hybrid object are confused, in the second flowchart illustrated in FIG. 12, the confusion between the sound in the real space and the sound of the hybrid object can be eliminated by changing the direction of the face of the listener 6.

In step S54, the processor 77 waits for a predetermined period of time (step S54) so that the listener 6 can turn his or her face.

Then, the processor 77 determines again whether the sounds in the sound source directions overlap (step S55), and if the sounds still overlap each other (step S55: YES), the placement correction section 36 changes the position of the hybrid object (step S51).

When the overlapping was eliminated (step S55: NO), the placement correction section 36 moves back the hybrid object, if the placement position thereof had been corrected, to its original position (step S52) while leaves the hybrid object at that position if the placement position thereof was not corrected (step S52).

In addition to the explanation above, in the present embodiment, the hybrid object is fixed to the visual space of the listener 6 in the HMD 7, which requires to prevent the sound in the real space and the sound of the hybrid object from being confused due to the motion of the listener 6. The confusion of the sounds may be prevented as follows.

That is, if the listener 6 is approaching the sound in the real space as he or she moves, the movement of the sound of the hybrid object is made stopped before the sound of the hybrid object overlaps the sound in the real space. Then, after the listener 6 moves away from the sound in the real space and thus the possibility of the confusion with the sound in the real space is eliminated, the sound of the hybrid object is moved back to the original position to which it was fixed.

Furthermore, even though the listener 6 is not moving, if the confusion of the sounds occurs due to the movement of the sound in the real space, the placement position of the sound of the hybrid object may be corrected by making it move horizontally (either left or right) or vertically.

Still further, the placement position of the AR object of the hybrid object may or may not be moved in synchronization with the correction of the position of the sound of the hybrid object.

Specifically, the placement position of the AR object is moved if the listener 6 needs to see the object in the real space, which is the source of the sound in the real space, without being visually disturbed by the AR object of the hybrid object, but if not necessary, the placement position of the AR object is not moved.

Still further, the AR object of the hybrid object may be stopped to be displayed before the sound of the hybrid object and the sound in the real space overlap each other. There-after, the AR object of the hybrid object is displayed again when the confusion of the sounds is eliminated. This allows the listener to see the object in the real space, which is the source of the sound in the real space, without being visually disturbed by the AR object of the hybrid object.

As described above, in a head-mounted display for playing a hybrid object, a user can also listen to a stereoscopic sound while confusion with a sound in a real space being avoided.

The confusion of the sound in the real space and the sound of the audio AR object 5 or sound of the hybrid object described in the first, second, third, and fourth embodiments may be avoided, for example, by the methods according to (1) to (9) below.

(1) In the case where the sound image of the sound of the audio AR object 5 or hybrid object moves in the vertical direction with respect to the front of the listener 6, the sound image of the audio AR object 5 or hybrid object may be temporarily made moved in the horizontal direction (for example, up to plus or minus 4 degrees, which is considered as the limitation of auditory perception in the horizontal direction).

(2) In the case where the sound image of the sound of the audio AR object 5 or hybrid object moves in the horizontal direction with respect to the front of the listener 6, the sound image of the audio AR object 5 or hybrid object may be temporarily made moved in the vertical direction.

(3) In the case where the sound image of the sound of the audio AR object 5 or hybrid object moves in the depth direction with respect to the front of the listener 6, the sound image of the audio AR object 5 or hybrid object may be temporarily made moved in the horizontal direction or the vertical direction.

(4) The sound image control of the sound of the audio AR object 5 or hybrid object may be carried out based on the frequency characteristics of the sound in the real space and the frequency characteristics of the audio AR object 5 or hybrid object. No action is taken for the audio AR object 5 or hybrid object having the frequency characteristics which do not interfere the listener's hearing of the sound in the real space.

(5) The sound image of the sound of the audio AR object 5 or hybrid object may not be made moved when the head of the listener 6 moves in the vertical and front and rear directions. The sound image of the sound of the audio AR object 5 or hybrid object is not made moved as well when the motion of the head of the listener 6 is within 4 degrees or less in the left and right direction.

(6) The sound image of the sound of the audio AR object 5 or hybrid object may not be made moved when the body of the listener moves in the vertical and front and rear directions. The sound image of the sound of the audio AR object 5 or hybrid object is not made moved as well when the motion of the body of the listener 6 is within 4 degrees or less in the left and right direction.

(7) When the AR object of the hybrid object disappears from the field of view due to the motion of the head or body of the listener 6, the sound of the hybrid object is also made stopped to be output.

(8) The sound image control of the sound of the audio AR object 5 or hybrid object may be carried out in accordance with the predetermined output priority of the sound of the AR object 5 and the sound in the real space.

(9) In the case where a plurality of sounds is present in the real space, the sound image of the sound of the audio AR object 5 or hybrid object is controlled so as not to interfere the listener's hearing of each of the sounds.

In the above, the embodiments of the present invention have been described, and of course, the configurations for implementing the technical features according to the present invention are not limited to those described in these embodiments and various modifications can be made. For example, the embodiments described above have been explained in detail for the purpose of making the present invention to be understood easily, and thus are not necessarily limited to those having all the configurations as described.

Furthermore, a part of the configuration of an embodiment may be replaced with the configuration of a further embodiment, and the configuration of an embodiment may include the configuration of a further embodiment.

Still further, a part of the configuration of each embodiment may be added, deleted, or replaced with other configurations.

Note that each of the components and relative size thereof described in the drawings are simplified and idealized for the purpose of making the present invention understood easily, and thus, practically, they may have more complicated shapes.

All of these are included in the scope of the present invention, and the numerical values and messages appearing in the text and drawings are merely examples. Accordingly, the advantageous effects of the present invention are not impaired even if different ones are used.

Furthermore, each of the programs described in the examples of the processing may be an independent program, or a plurality of programs configuring one application program.

Still further, the orders of executing the processes may be changed.

Still further, some or all the functions and the like of the present invention may be implemented by hardware, for example, by designing them with an integrated circuit.

Still further, a microprocessor unit, a CPU, or the like may interpret and execute an operation program so that some or all the functions and the like of the present invention can be implemented by software.

Still further, the implementation range of the software is not limited, and hardware and software may be used in combination.

Still further, some or all the functions may be realized by a server. Note that the server may be the one which executes the functions in cooperation with other components by communication, which may be, for example, a local server, a cloud server, an edge server, a net service, or the like. Information such as programs, tables, and files for realizing the functions may be stored in a recording device such as a memory, a hard disk, or an SSD (Solid State Drive), or a recording medium such as an IC card, an SD card, or a DVD, or may be stored in a device on a communication network.

Still further, the control lines and information lines which are considered to be necessary for the purpose of explanation are indicated herein, but not all the control lines and information lines of actual products are necessarily indicated. It may be considered that almost all the components are actually connected to each other.

REFERENCE SIGNS LIST

1: audio AR object playback device
1A: audio AR object playback device
2: audio collection and playback section
3: information processing section
3A: information processing section
4 real space

4A: sound source in real space
5 audio AR object
5A: placement position
6: listener
7: HMD (head-mounted display)
20: first communication unit
21: motion sensor
22A: left microphone array
22B: left audio playback section
23A: right microphone array
23B: right audio playback section
30: input operation section
31: communication control section
32: level detection section
33: sound source direction detection section
34: main control section
35: audio AR object placement section
36: placement correction section
37: head transfer function decision section
38: convolution calculation section
40A: audio AR object D/B
40B: head transfer function D/B
40C: registered microphone sound dataset
40D: hybrid object D/B
41: microphone array signal addition section
42: microphone array signal recognition section
50: second communication unit
51: processor
52: RAM
53: ROM
53A: basic operation program
53B: audio AR object playback program
54: data storage area
55: camera
56: range sensor
57: motion sensor
58: image display and input operation section
59: audio section
70: camera
71: range sensor
72: motion sensor
73: image display section
74A: left microphone array
74B: left audio playback section
75A: right microphone array
75B: right audio playback section
76: wireless communication unit
77: processor
78: RAM
79: ROM
79A: basic operation program
79B: audio AR object playback program
80: data storage area
81: control unit
82: holder

The invention claimed is:

1. An audio augmented reality object playback device comprising:

a microphone;

an audio playback device to be worn on a left ear side and a right ear side of a listener; and a processor connected to each of the microphone and the audio playback device, the processor being configured to:

place an audio augmented reality object in a real space;

acquire a stereoscopic audio signal from the audio augmented reality object to carry out control for causing the audio playback device to output a sound based on the stereoscopic audio signal;

detect a level of a sound in the real space collected by the microphone and a sound source direction of the sound in the real space and correct a placement position of the audio augmented reality object based on a result of the detection so as to separate the placement position of the audio augmented reality object from the sound source direction of the sound in the real space; and carry out control for causing the audio playback device to output the sound based on the stereoscopic sound signal at the placement position as corrected, wherein the processor is configured to, when a level difference between the level of the sound in the real space collected by the microphone and a level of the stereoscopic sound signal is less than a level difference threshold set to determine that the sound in the real space and the sound of the augmented reality object are confused, and also when the sound source direction of the sound in the real space and a direction of the placement position of the augmented reality object are within a same direction range set to determine that the sound in the real space and the sound of the augmented reality object are confused, correct the placement position of the augmented reality object so as to separate the placement position of the audio augmented reality object from the sound source direction of the sound in the real space, and wherein the processor is configured to, after correcting the placement position of the audio augmented reality object, when the level difference is equal to or more than the level difference threshold or the sound source direction of the sound in the real space and the direction of the placement position of the audio augmented reality object are out of the same direction range, move back the audio augmented reality object to the placement position before the correction.

2. The audio augmented reality object playback device according to claim 1, wherein the processor is configured to:

execute audio recognition processing to recognize the sound in the real space collected by the microphone; and based on a result of the audio recognition processing, combine the sound in the real space and the stereoscopic audio signal and output the stereoscopic audio signal as combined to the audio playback device.

3. The audio augmented reality object playback device according to claim 1, wherein the audio augmented reality object is placed in a world coordinate system fixed to the real space.

4. The audio augmented reality object playback device according to claim 1, wherein the audio augmented reality object is placed in a local coordinate system fixed to the audio playback device.

5. The audio augmented reality object playback device according to claim 1, wherein the processor is provided in a mobile information terminal or a wearable terminal, the microphone and the audio playback device are provided in earphones or a headphone which is configured separately from the mobile information terminal, and the mobile information terminal and the earphones or the headphone are connected to each other by communication.

6. The audio augmented reality object playback device according to claim 1, wherein the processor is provided in a mobile information terminal, and the microphone, the audio playback device, and the processor are integrally configured with a head-mounted display.

7. An audio augmented reality object playback device comprising:

a microphone;

an audio playback device to be worn on a left ear side and a right ear side of a listener; and a processor connected to each of the microphone and the audio playback device, the processor being configured to:

place an audio augmented reality object in a real space;

acquire a stereoscopic audio signal from the audio augmented reality object to carry out control for causing the audio playback device to output a sound based on the stereoscopic audio signal;

detect a level of a sound in the real space collected by the microphone and a sound source direction of the sound in the real space and correct a placement position of the audio augmented reality object based on a result of the detection so as to separate the placement position of the audio augmented reality object from the sound source direction of the sound in the real space; and carry out control for causing the audio playback device to output the sound based on the stereoscopic sound signal at the placement position as corrected, wherein the processor is configured to correct the placement position of the audio augmented reality object in a direction opposite to a direction of a relative movement between the audio augmented reality object and a sound source of the sound in the real space.

8. The audio augmented reality object playback device according to claim 7, wherein the processor is configured to:

execute audio recognition processing to recognize the sound in the real space collected by the microphone; and based on a result of the audio recognition processing, combine the sound in the real space and the stereoscopic audio signal and output the stereoscopic audio signal as combined to the audio playback device.

9. The audio augmented reality object playback device according to claim 8, wherein the processor is configured to correct the placement position of the audio augmented reality object at a distance that is the same as a distance from the placement position of the audio augmented reality object before the correction to the listener and also in a direction opposite to the direction of the relative movement.

10. The audio augmented reality object playback device according to claim 7, wherein the processor is configured to, when a level difference between the level of the sound in the real space collected by the microphone and a level of the stereoscopic sound signal is less than a level difference threshold set to determine that the sound in the real space and the sound of the augmented reality object are confused, and also when the sound source direction of the sound in the real space and a direction of the placement position of the augmented reality object are within a same direction range set to determine that the sound in the real space and the sound of the augmented reality object are confused, correct the placement position of the augmented reality object so as to separate the placement position of the audio augmented reality object from the sound source direction of the sound in the real space.

11. The audio augmented reality object playback device according to claim 10, wherein the processor is configured to, after correcting the placement position of the audio augmented reality object, when the level difference is equal to or more than the level difference threshold or the sound source direction of the sound in the real space and the direction of the placement position of the audio augmented reality object are out of the same direction range, move back the audio augmented reality object to the placement position before the correction.

12. The audio augmented reality object playback device according to claim 10, wherein the processor is configured to correct the placement position of the audio augmented reality object at a distance that is the same as a distance from the placement position of the audio augmented reality object before the correction to the listener and also in a direction opposite to the direction of the relative movement.

13. The audio augmented reality object playback device according to claim 10, wherein the audio augmented reality object is placed in a world coordinate system fixed to the real space.

14. The audio augmented reality object playback device according to claim 10, wherein the audio augmented reality object is placed in a local coordinate system fixed to the audio playback device.

15. The audio augmented reality object playback device according to claim 7, wherein the processor is configured to correct the placement position of the audio augmented reality object at a distance that is the same as a distance from the placement position of the audio augmented reality object before the correction to the listener and also in a direction opposite to the direction of the relative movement.

16. The audio augmented reality object playback device according to claim 7, wherein the audio augmented reality object is placed in a world coordinate system fixed to the real space.

17. The audio augmented reality object playback device according to claim 7, wherein the audio augmented reality object is placed in a local coordinate system fixed to the audio playback device.

18. The audio augmented reality object playback device according to claim 7, wherein the processor is provided in a mobile information terminal or a wearable terminal, the microphone and the audio playback device are provided in earphones or a headphone which is configured separately from the mobile information terminal, and the mobile information terminal and the earphones or the headphone are connected to each other by communication.

19. The audio augmented reality object playback device according to claim 7, wherein the processor is provided in a mobile information terminal, and the microphone, the audio playback device, and the processor are integrally configured with a head-mounted display.

* * * * *